United States Patent
Tung et al.

(10) Patent No.: US 11,457,175 B2
(45) Date of Patent: Sep. 27, 2022

(54) SPLIT-TYPE DISPLAY SYSTEM

(71) Applicant: AICONNX TECHNOLOGY CORPORATION, Hsinchu (TW)

(72) Inventors: Hsu-Jung Tung, Hsinchu (TW); Wei-Liang Cheng, Hsinchu (TW); Lien-Hsiang Sung, Hsinchu (TW)

(73) Assignee: AICONNX TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 17/328,075

(22) Filed: May 24, 2021

(65) Prior Publication Data

US 2022/0086389 A1   Mar. 17, 2022

Related U.S. Application Data

(60) Provisional application No. 63/079,065, filed on Sep. 16, 2020.

(30) Foreign Application Priority Data

Feb. 22, 2021   (TW) .................. 110106183

(51) Int. Cl.
 *H04N 7/10* (2006.01)
 *H04N 5/067* (2006.01)
 *H04N 7/01* (2006.01)
(52) U.S. Cl.
 CPC ............. *H04N 7/102* (2013.01); *H04N 5/067* (2013.01); *H04N 7/013* (2013.01)

(58) Field of Classification Search
 CPC ........ H04N 7/102; H04N 5/067; H04N 7/013; H04N 7/104; G09G 2370/12; G09G 2370/20; G09G 5/006
 See application file for complete search history.

(56) References Cited

U.S. PATENT DOCUMENTS

| | | | | |
|---|---|---|---|---|
| 5,377,228 | A * | 12/1994 | Ohara ................... | H04L 12/422 370/503 |
| 5,677,981 | A * | 10/1997 | Kato ..................... | H04N 9/7973 386/E9.048 |
| 8,737,521 | B2 * | 5/2014 | Cornelius ............... | H04B 3/26 375/295 |
| 2019/0335139 | A1 * | 10/2019 | Nishio .................. | H04N 7/0806 |
| 2020/0364831 | A1 * | 11/2020 | Ozeki .................... | G06N 20/00 |
| 2022/0084452 | A1 * | 3/2022 | Tung ........................ | H04L 1/00 |

* cited by examiner

Primary Examiner — Michael Lee
(74) Attorney, Agent, or Firm — McClure, Qualey & Rodack, LLP

(57) ABSTRACT

A split-type display system includes a processing device, a display device, and a transmission cable connecting the processing device and the displaying device. The processing device includes a processing unit, a first and a second conversion unit. The display device includes a third and a fourth conversion unit, and a display unit. The processing unit generates a first image signal and a first timing control signal. The first and the second conversion units, respectively, converts the first image signal and the first timing control signal into a second image signal and a second timing control signal. The third and the fourth conversion units, respectively, receive and convert the second image signal and the second timing control signal into a third image signal and a third timing control signal. The display unit displays the third image signal according to the third timing control signal.

14 Claims, 7 Drawing Sheets

SPLIT-TYPE DISPLAY SYSTEM

CROSS-REFERENCES TO RELATED APPLICATIONS

This application claims the benefit of U.S. provisional application Ser. No. 63/079,065, filed on Sep. 16, 2020 and claims the priority of Patent Application No. 110106183 filed in Taiwan, R.O.C. on Feb. 22, 2021. The entirety of the above-mentioned patent applications are hereby incorporated by references herein and made a part of the specification.

BACKGROUND

Technical Field

The present disclosure relates to a split-type display system, and in particular, to a display system having a host and a display screen separate from each other.

Related Art

For a traditional display system such as a television, a host and a display screen of the television are arranged in the same enclosure. Such a configuration leads to an excessive volume of the display system. When a user installs or places the display system, the display system occupies too much space, which causes inconvenience and affects the appearance of surroundings around the position at which the display system is placed.

With the advancement of science and technology, people also have increasing demands for audio and visual effects and quality of multimedia. For example, people pursue vivid and lifelike display pictures and good experience. The picture quality and resolution of audio and image specification technologies have been improved. As high picture quality and high resolution require transmission of a huge number of signals, the efficiency of signal transmission needs to be increased. Specifications of hardware have also been improved accordingly. Therefore, in the industry, a plurality of transmission channels is designed in a transmission cable. However, the volume of the transmission cable increases with the number of transmission channels.

SUMMARY

As described above, in order to improve the efficiency of signal transmission and support the transmission of a huge number of signals, how to reduce excessive costs caused by an excessively thick transmission cable and avoid signal energy weakening during signal transmission caused by an excessively long transmission cable are problems urgently to be solved.

In view of the above, in some embodiments, a split-type display system includes a processing device, a display device, and a transmission cable. The processing device includes a processing unit, a first conversion unit, and a second conversion unit. The display device includes a third conversion unit, a fourth conversion unit, and a display unit. The processing unit is configured to generate a first image signal and a first timing control signal. The first timing control signal has a first timing control rate and a first timing control channel number, and the first timing control rate is less than a first image rate of the first image signal. The first conversion unit is configured to convert the first image signal into a second image signal having a second image rate. The second conversion unit is configured to convert the first timing control signal into a second timing control signal. The second timing control signal has a second timing control rate and a second timing control channel number, the first timing control rate is less than the second timing control rate, and the first timing control channel number is greater than the second timing control channel number. The third conversion unit is configured to receive and convert the second image signal into a third image signal. The fourth conversion unit is configured to receive and convert the second timing control signal into a third timing control signal. The third timing control signal has a third timing control rate and a third timing control channel number, and the third timing control rate is less than a third image rate of the third image signal. The display unit is configured to display the third image signal according to the third timing control signal. The transmission cable is configured to connect the first conversion unit and the second conversion unit to the third conversion unit and the fourth conversion unit. A channel number of the transmission cable is equal to a sum of a image channel number of the second image signal and the second timing control channel number.

DETAILED DESCRIPTION

Figure 1:
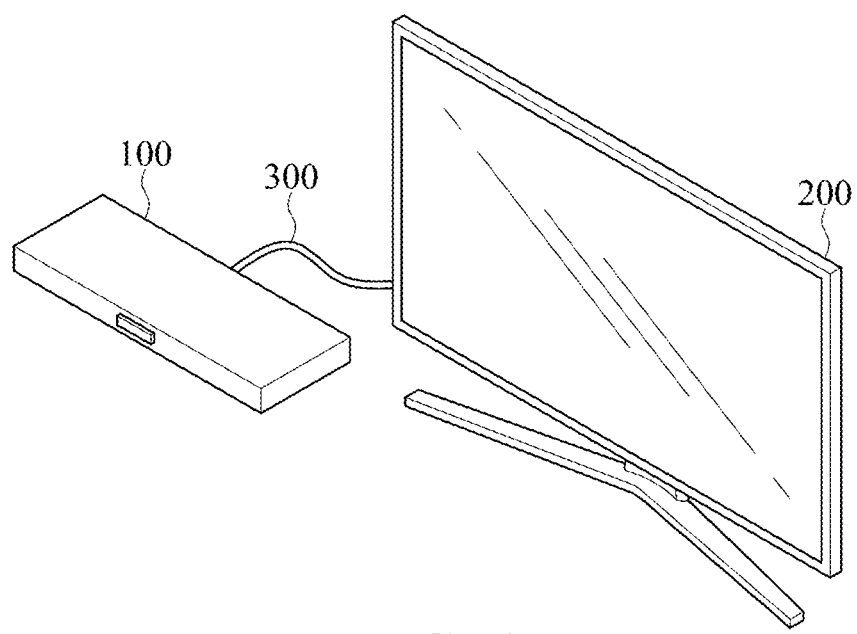
FIG. 1 is a schematic diagram of an embodiment of a split-type display system according to the present disclosure.

Referring to FIG. 1, a split-type display system includes a processing device 100, a display device 200, and a transmission cable 300. The split-type display system is applicable to a multimedia player. For example, the split-type display system is applied to a television. The display device 200 is a display screen of the television, and the processing device 100 is a host of the television. The processing device 100 may generate an image signal and a timing control (TCON) signal and transmit the signals to the display device 200. In some embodiments, the processing device 100 generates a video signal and a timing control signal. The video signal includes at least an image signal and at least an audio signal. The image signal is a high-speed signal, and the timing control signal is a low-speed signal. The display device 200 controls regular conversion of a polarity of a liquid crystal in the display device 200 according to the timing control signal. The regular conversion of the polarity of the liquid crystal can avoid burn-in of the display device 200 at a specific pixel. The display device 200 displays the image signal according to the liquid crystal of which the polarity is converted. The image signal may include a differential signal, and the differential signal includes a positive differential signal and a negative differential signal. However, the present disclosure is not limited thereto. The image signal may not be a differential signal (for example, the image signal is a single transmission signal). The timing control signal is not a differential signal, and the timing control signal is a control signal of a single transmission signal. In this disclosure, the image signal includes at least an image signals and at least an audio signal.

The processing device 100 and the display device 200 are not designed to be in one housing. The processing device 100 and the display device 200 are two separate devices. The processing device 100 and the display device 200 are connected to each other through a transmission cable 300. The transmission cable 300 has two connectors. One of the connectors is connected to a connector on the processing device 100, and the other connector of the transmission cable 300 is connected to a connector on the display device 200. The transmission cable 300 includes a plurality of pairs of transmission channels configured to transmit the image signal. One of each pair of the signal transmission channels is configured to transmit the positive differential signal of the image signal, and the other of each pair of the transmission channels is configured to transmit the negative differential signal of the image signal. The transmission cable 300 further includes a plurality of single transmission channels configured to transmit the timing control signal. In this way, the processing device 100 transmits the image signal and the timing control signal to the display device 200 through the transmission cable 300, and the display device 200 converts the polarity of the liquid crystal according to the timing control signal and displays the image signal according to the liquid crystal of which the polarity is converted. A length of the transmission cable 300 may be arbitrarily designed depending on a user. The processing device 100 and the display device 200 may be placed at positions spaced apart by more than a predetermined distance according to usage habits of the user and constraints of an environmental space. In some embodiments, the distance between the processing device 100 and the display device 200 and the length of the transmission cable 300 may be more than 50 centimeters, or even may be a few meters.

Figure 2:
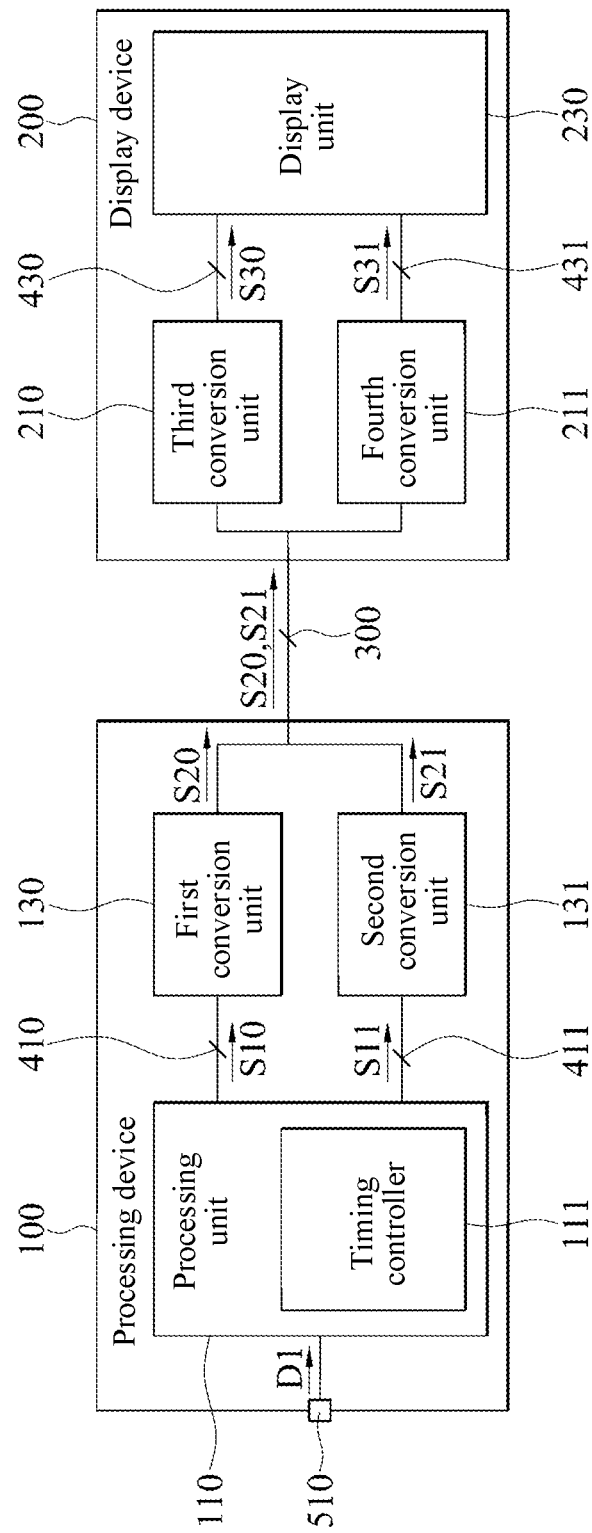
FIG. 2 is a schematic block diagram of an embodiment of the split-type display system according to the present disclosure.

Referring to FIG. 2, the processing device 100 includes a processing unit 110, a first conversion unit 130, and a second conversion unit 131. The first conversion unit 130 and the second conversion unit 131 are coupled between the processing unit 110 and the transmission cable 300. The first conversion unit 130 and the processing unit 110 have a plurality of pairs of transmission channels therebetween (which are referred to as a first image channel 410 below, and as shown in the figure, a diagonal line is drawn on the first image channel 410 to indicate that the first image channel includes a plurality of pairs of transmission channels). A communication port 510 is coupled to the processing unit 110. The communication port 510 receives and transmits image data D1 from the outside to the processing unit 110. The processing unit 110 generates a first image signal S10 according to the image data D1, and the processing unit 110 transmits the first image signal S10 according to a first image rate (transmission rate of image signal). The first image signal S10 is transmitted to the first conversion unit 130 through the first image channel 410. Each pair of transmission channels in the first image signal S10 are transmitted by each pair of the transmission channels in the first image channel 410. The first image signal S10 and the first image channel 410 have substantially the same first image channel number (the number of the first image channel).

The processing unit 110 includes a timing controller 111. The timing controller 111 is coupled to the second conversion unit 131, and the timing controller 111 generates a first timing control signal S11. The second conversion unit 131 and the timing controller 111 have a plurality of transmission channels therebetween (which are referred to as a first timing control channel 411 below). The timing controller 111 transmits the first timing control signal S11 according to a first timing control rate (transmission rate of the timing control signal). The first timing control signal S11 is transmitted to the second conversion unit 131 through the first timing control channel 411. Each single transmission channel in the first timing control signal S11 is transmitted by each single transmission channel of the first timing control channel 411. The first timing control signal S11 and the first timing control channel 411 have the same first timing control channel number (the number of the timing control channel).

The first conversion unit 130 receives and converts, into a second image signal S20, the first image signal S10 having the first image rate. The second image signal S20 has a second image rate greater than the first image rate. The second conversion unit 131 receives and converts the first timing control signal S11 into a second timing control signal S21. A second timing control rate of the second timing control signal S21 is greater than the first timing control rate of the first timing control signal S11. The first conversion unit 130 and the second conversion unit 131 respectively transmit the second image signal S20 and the second timing control signal S21 to the transmission cable 300.

The transmission cable 300 includes a plurality of pairs of transmission channels and a plurality of transmission channels, which are respectively configured to transmit a plurality of pairs of second image signals S20 (which are referred to as a second image channel below) and a plurality of second timing control signals S21 (which are referred to as a second timing control channel below). A width of the transmission cable 300 is related to a number of second image channels (which is referred to as a second image channel number below) and a number of second timing control channels (which is referred to as a second timing control channel number below). A total transmission channel number of the transmission cable 300 is substantially equal to a sum of the second image channel number and the second timing control channel number. Each pair of transmission channels in the second image signal S20 are transmitted to the display device 200 through each pair of transmission channels of the second image channel, and each transmission channel in the second timing control signal S21 is transmitted to the display device 200 through each transmission channel of the second timing control channel. The second image signal S20 and the second timing control signal S21 respectively have the second image channel number and the second timing control channel number. Since the second image rate and the second timing control rate are respectively greater than the first image rate and the first timing control rate, the second image channel number and the second timing control channel number are respectively less than the first image channel number and the first timing control channel number. It is assumed that a width of the transmission cable 300 using the first image channel number and the first timing control channel number is greater than a width of the transmission cable using the second image channel number and the second timing control channel number. Therefore, when the transmission cable 300 uses the second image channel number and the second timing control channel number, manufacturing costs can be reduced, and more convenience is brought to users for use.

In some embodiments, after the display device 200 receives the second image signal S20 and the second timing control signal S21, the display device 200 reduces transmission rates of the second image signal S20 and the second timing control signal S21 to that before an increase, and then displays a image and converts a polarity of the liquid crystal, but the present disclosure is not limited thereto. Alternatively, the display device 200 may reduce a transmission rate of the second image signal S20 to a transmission rate that is different from that before an increase, and then displays a image. In detail, the display device 200 includes a third conversion unit 210, a fourth conversion unit 211, and a display unit 230. The third conversion unit 210 and the fourth conversion unit 211 are coupled between the transmission cable 300 and the display unit 230. The third conversion unit 210 and the display unit 230 have a plurality of pairs of transmission channels therebetween (which are referred to as a third image channel 430). The fourth conversion unit 211 and the display unit 230 have a plurality of transmission channels therebetween (which are referred to as a third timing control channel 431). The third conversion unit 210 receives the second image signal S20 from the transmission cable 300, and the third conversion unit 210 converts the second image signal S20 into a third image signal S30. The third image signal S30 has a third image rate. Each pair of transmission channels in the third image signal S30 are transmitted by each pair of the transmission channels in the third image channel 430. The third image signal S30 and the third image channel 430 have the same third image channel number. The third image channel number is less than the second image channel number, and the third image channel number may be substantially the same as or different from the first image channel number. The third image rate is less than the second image rate, and the third image rate may be substantially the same as or different from the first image rate. When the third image rate is substantially the same as the first image rate, the third image signal S30 is substantially the same as the first image signal S10.

After the fourth conversion unit 211 receives the second timing control signal S21 from the transmission cable 300, the fourth conversion unit 211 converts the second timing control signal S21 into a third timing control signal S31. The third timing control signal S31 has a third timing control rate. Each transmission channel in the third timing control signal S31 is transmitted by each transmission channel of the third timing control channel 431. Both channel numbers of the third timing control signal S31 and the third timing control channel 431 are a third timing control channel number. The third timing control channel number is less than the second timing control channel number, and the third timing control channel number may be substantially the same as or different from the first timing control channel number. The third timing control rate is less than the second timing control rate, and the third timing control rate is substantially the same as or different from the first timing control rate. When the third timing control rate is substantially the same as the first timing control rate, the third timing control signal S31 is substantially the same as the first timing control signal S11. The fourth conversion unit 211 transmits the third timing control signal S31 to the display unit 230 through the third timing control channel 431 at the third timing control rate. The display unit 230 converts the polarity of the liquid crystal according to the third timing control signal S31 and displays the third image signal S30.

Based on this, the channel number of the transmission cable 300 can be reduced to avoid inconvenience to a user and costs of the transmission cable 300 as a result of an excessively thick transmission cable 300. In addition, the second image signal S20 and the second timing control signal S21 whose transmission rates are increased may be respectively converted into the third image signal S30 and the third timing control signal S31 through the conversion units 210 and 211, the third image rate is less than the second image rate, and the third timing control rate is less than the second timing control rate. The display unit 230 may therefore convert the polarity of the liquid crystal according to the third timing control signal S31, and display the third image signal S30.

In some embodiments, when the first image channel number divided by the second image channel number is a ratio, the second image rate divided by the first image rate is the ratio, the third image channel number divided by the second image channel number is the ratio, and the second image rate divided by the third image rate is the ratio. When the first timing control channel number divided by the second timing control channel number is a ratio, the second timing control rate divided by the first timing control rate is the ratio, the third timing control channel number divided by the second timing control channel number is the ratio, and the second timing control rate divided by the third timing control rate is the ratio. In other words, the channel number is inversely proportional to the transmission rate, and a multiple by which the transmission rate is increased may correspond to a multiple by which the channel number is reduced. When the second image rate and the second timing control rate is respectively twice the first image rate and the first timing control rate, the second image channel number and the second timing control channel number is respectively half of the first image channel number and half of the first timing control channel number. When the second image rate and the second timing control rate is respectively twice the third image rate and the third timing control rate, the second image channel number and the second timing control channel number may be respectively half of the third image channel number and half of the third timing control channel number. However, the present disclosure is not limited to the above embodiments. In some other embodiments, the ratio of the first image rate to the second image rate, the ratio of the second image channel number to the third image channel number, the ratio of the second image rate to the third image rate, and the ratio of the first image channel number to the second image channel number are not a same fixed ratio. In some other embodiments, the ratio of the first timing control rate to the second timing control rate, the ratio of the second timing control channel number to the third timing control channel number, the ratio of the second timing control rate to the third timing control rate, and the ratio of the first timing control channel number to the second timing control channel number are not a same fixed ratio.

In some embodiments, the image signals S10, S20, and S30 are high-speed signals, and the timing control signals S11, S21, and S31 are low-speed signals. A transmission rate of the timing control signal S11 is less than a transmission rate of the image signal 510, a transmission rate of the timing control signal S21 is less than a transmission rate of the image signal S20, and a transmission rate of the timing control signal S31 is less than a transmission rate of the image signal S30. For example, if the first image channel number is 16 pairs, the second image channel number is 8 pairs, the first image rate is 75 MHz, and the second image rate is 150 MHz, the above ratio is 2. If the first timing control channel number is 16, the second timing control channel number is 8, the first timing control rate is 50 MHz, and the second timing control rate is 100 MHz, the above ratio is also 2.

In some embodiments, the first timing control channel number is equal to the first image channel number, the second timing control channel number is equal to the second image channel number, and the third timing control channel number is equal to the third image channel number. In some other embodiments, the present disclosure is not limited to the above. The first timing control channel number may not be equal to the first image channel number either, the second timing control channel number may not be equal to the second image channel number either, and the third timing control channel number may not be equal to the third image channel number either.

Figure 3:
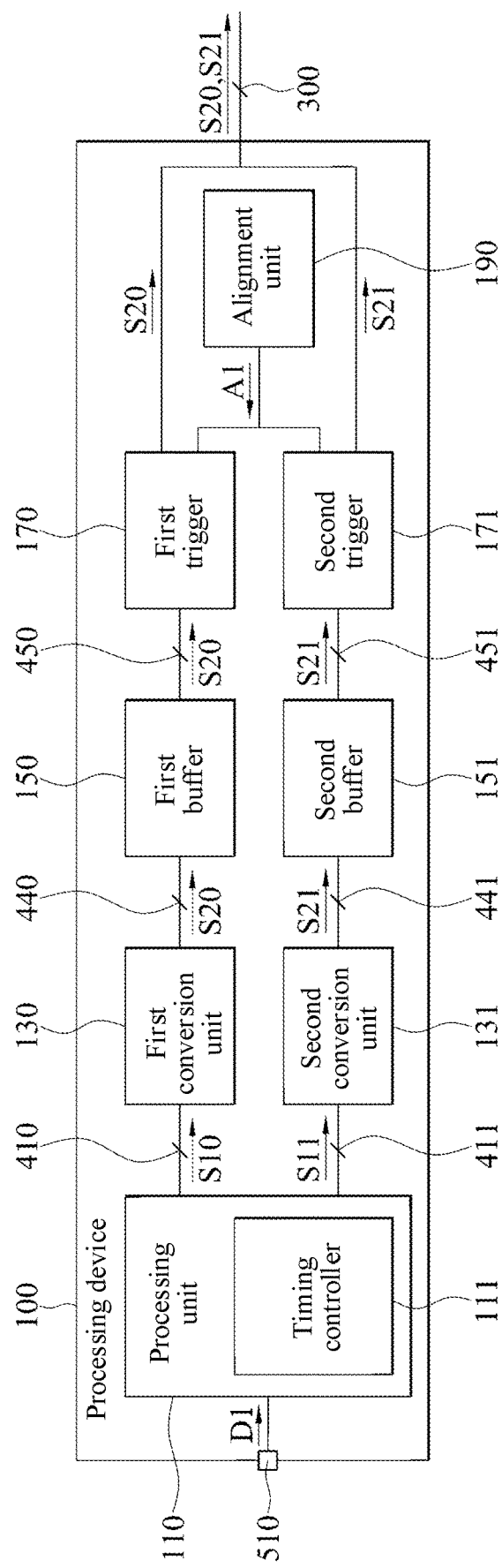
FIG. 3 is a schematic block diagram of another embodiment of a processing device of the split-type display system according to the present disclosure.

In some embodiments, referring to FIG. 3, the processing device 100 further includes a first buffer 150, a first trigger 170, a second buffer 151, and a second trigger 171. The first conversion unit 130 and the second conversion unit 131 are coupled to the processing unit 110, the processing unit 110 and the first conversion unit 130 have a first image channel 410 therebetween, and the processing unit 110 and the second conversion unit 131 have a first timing control channel 411 therebetween. The first buffer 150 is coupled between the first conversion unit 130 and the first trigger 170, the first conversion unit 130 and the first buffer 150 have a plurality of pairs of transmission channels therebetween (which are referred to as a fourth image channel 440 below), and the first buffer 150 and the first trigger 170 have a plurality of pairs of transmission channels therebetween (which are referred to as a fifth image channel 450 below). The second buffer 151 is coupled between the second conversion unit 131 and the second trigger 171, the second conversion unit 131 and the second buffer 151 have a plurality of pairs of transmission channels therebetween (which are referred to as a fourth timing control channel 441 below), and the second buffer 151 and the second trigger 171 have a plurality of pairs of transmission channels therebetween (which are referred to as a fifth timing control channel 451 below). The first trigger 170 and the second trigger 171 are coupled to the transmission cable 300. The fourth image channel 440 and the fifth image channel 450 have the same second timing control channel number as the second image signal S20, and the fourth timing control channel 441 and the fifth timing control channel 451 have the same second image channel number as the second timing control signal S21.

The first conversion unit 130 stores the converted second image signal S20 to the first buffer 150 through the fourth image channel 440. The second conversion unit 131 stores the converted second timing control signal S21 to the second buffer 151 through the fourth timing control channel 441. An alignment unit 190 is coupled to the first trigger 170 and the second trigger 171, and the alignment unit 190 transmits an alignment signal A1 to the first trigger 170 and the second trigger 171. When the first trigger 170 and the second trigger 171 receive the alignment signal A1, the first trigger 170 obtains the second image signal S20 from the first buffer 150 through the fifth image channel 450, and the second trigger 171 obtains the second timing control signal S21 from the second buffer 151 through the fifth timing control channel 451. Moreover, the first trigger 170 and the second trigger 171 transmit the second image signal S20 and the second timing control signal S21 synchronously (that is, substantially at the same time) according to the alignment signal A1. The second image signal S20 and the second timing control signal S21 are synchronously transmitted to the display device 200 through the second image channel and the second timing control channel in the transmission cable 300, respectively. Based on this, the display device 200 synchronously receives the second image signal S20 and the second timing control signal S21, and the second image signal S20 and the second timing control signal S21 may correctly correspond to each other according to the synchronous receiving. In this way, errors as a result of a time difference during image displaying and conversion of the polarity of the liquid crystal can be avoided when the display device 200 processes the second image signal S20 and the second timing control signal S21.

Figure 4:
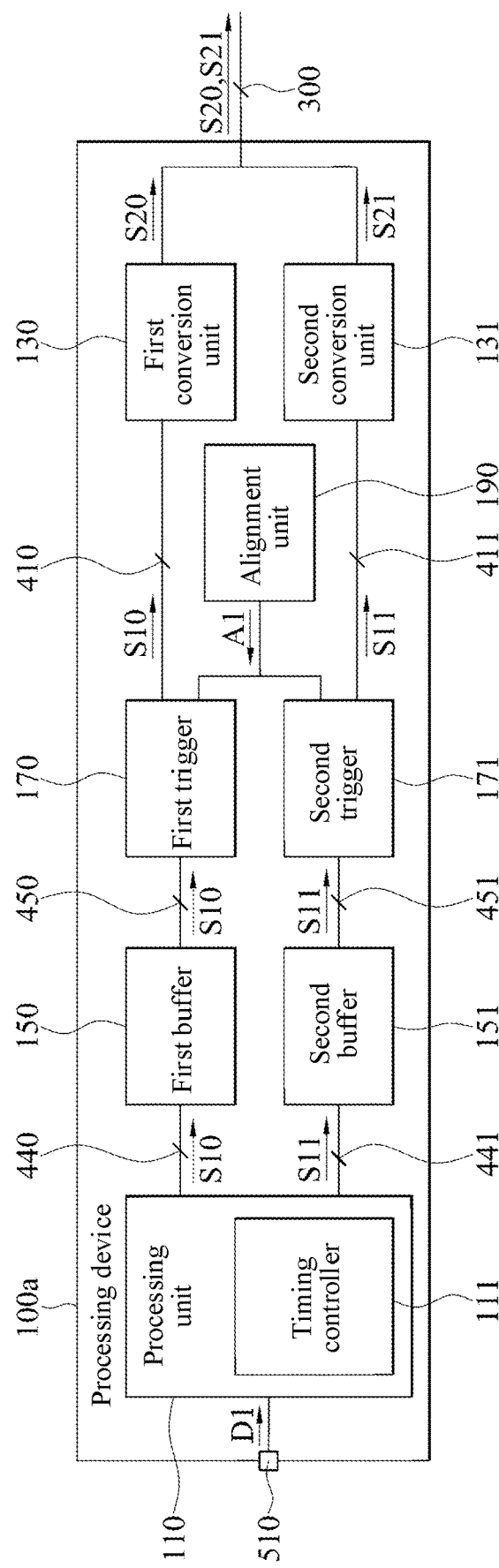
FIG. 4 is a schematic block diagram of another embodiment of a processing device of the split-type display system according to the present disclosure.

In some other embodiments, referring to FIG. 4, in a processing device 100a, positions of the first buffer 150 and the first trigger 170 may be transposed with a position of the first conversion unit 130, and positions of the second buffer 151 and the second trigger 171 may be transposed with a position of the first conversion unit 130. In detail, the first buffer 150 and the second buffer 151 are coupled to the processing unit 110, the first buffer 150 and the processing unit 110 have a fourth image channel 440 therebetween, and the second buffer 151 and the processing unit 110 have a fourth timing control channel 441 therebetween. The first trigger 170 is coupled between the first buffer 150 and the first conversion unit 130, the first trigger 170 and the first buffer 150 have a fifth image channel 450 therebetween, and the first conversion unit 130 and the first trigger 170 have a first image channel 410 therebetween. The second trigger 171 is coupled between the second buffer 151 and the second conversion unit 131, the second trigger 171 and the second buffer 151 have a fifth timing control channel 451 therebetween, and the second conversion unit 131 and the second trigger 171 have a first timing control channel 411 therebetween. The first conversion unit 130 and the second conversion unit 131 are coupled to the transmission cable 300. The fourth image channel 440 and the fifth image channel 450 have the same first image channel number as the first image signal S10, and the fourth timing control channel 441 and the fifth timing control channel 451 have the same first timing control channel number as the first timing control signal S11.

The processing unit 110 transmits the first image signal S10 to be stored in the first buffer 150 through the fourth image channel 440, and transmits the first timing control signal S11 to be stored in the second buffer 151 through the fourth timing control channel 441. The alignment unit 190 transmits the alignment signal A1 to the first trigger 170 and the second trigger 171. When the first trigger 170 and the second trigger 171 receive the alignment signal A1, the first trigger 170 obtains the first image signal S10 from the first buffer 150 through the fifth image channel 450, and the second trigger 171 obtains the first timing control signal S11 from the second buffer 151 through the fifth timing control channel 451. Moreover, the first trigger 170 and the second trigger 171 synchronously transmit the first image signal S10 and the first timing control signal S11 according to the alignment signal A1. The first image signal S10 and the first timing control signal S11 are synchronously transmitted to the first conversion unit 130 through the first image channel 410 and to the second conversion unit 131 through the first timing control channel 411. The first conversion unit 130 and the second conversion unit 131 may synchronously convert the first image signal S10 and the first timing control signal S11 into the second image signal S20 and the second timing control signal S21, and transmit the second image signal S20 and the second timing control signal S21 to the display device 200 through the second image channel and the second timing control channel in the transmission cable 300. Based on this, errors as a result of a time difference during image displaying and conversion of the polarity of the liquid crystal can be avoided when the display device 200 processes the second image signal S20 and the second timing control signal S21.

Figure 5:
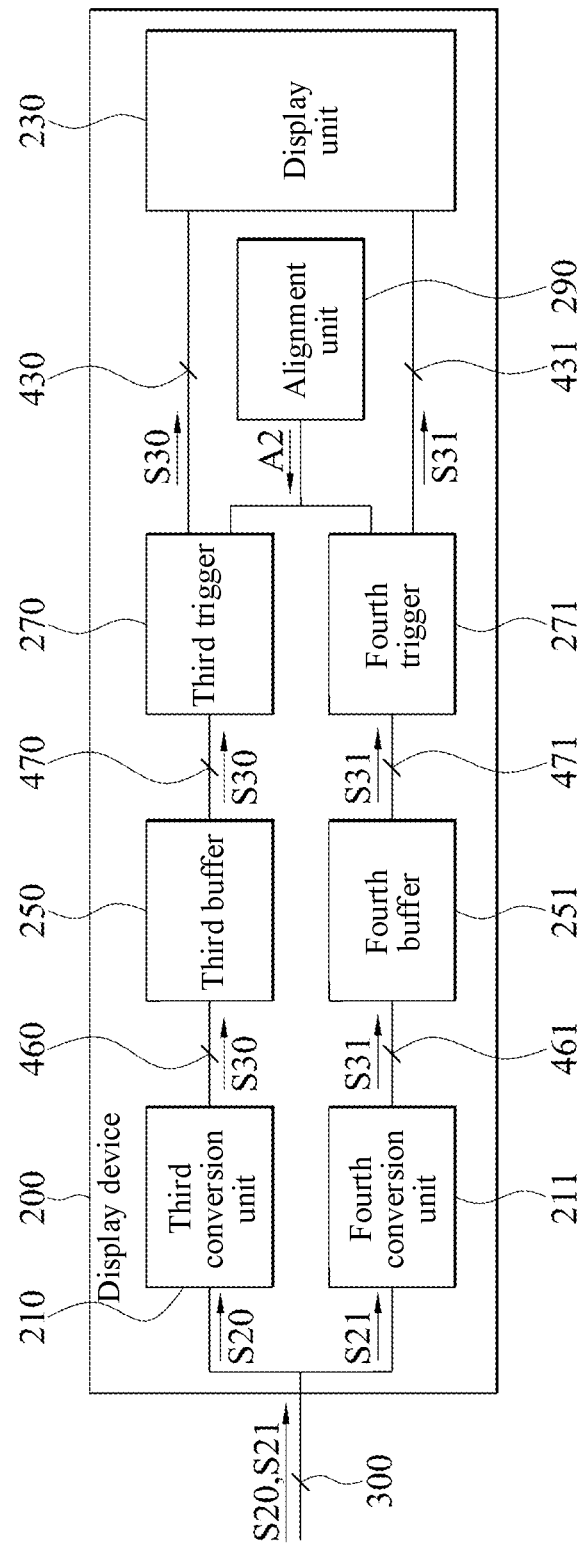
FIG. 5 is a schematic block diagram of another embodiment of a display device of the split-type display system according to the present disclosure.

In some embodiments, referring to FIG. 5, the display device 200 further includes a third buffer 250, a third trigger 270, a fourth buffer 251, and a fourth trigger 271. The third conversion unit 210 and the fourth conversion unit 211 are coupled to the transmission cable 300. The third buffer 250 is coupled between the third conversion unit 210 and the third trigger 270, the third conversion unit 210 and the third buffer 250 have a plurality of pairs of transmission channels therebetween (which are referred to as a sixth image channel 460 below), and the third buffer 250 and the third trigger 270 have a plurality of pairs of transmission channels therebetween (which are referred to as a seventh image channel 470 below). The fourth buffer 251 is coupled between the fourth conversion unit 211 and the fourth trigger 271, the fourth conversion unit 211 and the fourth buffer 251 have a plurality of pairs of transmission channels therebetween (which are referred to as a sixth timing control channel 461 below), and the fourth buffer 251 and the fourth trigger 271 have a plurality of pairs of transmission channels therebetween (which are referred to as a seventh timing control channel 471 below). The third trigger 270 and the fourth trigger 271 are coupled to the display unit 230, the third trigger 270 and the display unit 230 have a third image channel 430 therebetween, and the fourth trigger 271 and the display unit 230 have a third timing control channel 431 therebetween. Channel numbers of the sixth image channels 460, the seventh image channels 470, and the third image signals S30 are all the third image channel number, and channel numbers of the sixth timing control channels 461, the seventh timing control channels 471, and the third timing control signals S31 are all the third timing control channel number.

The third conversion unit 210 and the fourth conversion unit 211 respectively convert the second image signal S20 and the second timing control signal S21 from the transmission cable 300 into the third image signal S30 and the third timing control signal S31. The third conversion unit 210 stores the third image signal S30 in the third buffer 250 through the sixth image channel 460, and stores the third timing control signal S31 in the fourth buffer 251 through the sixth timing control channel 461. An alignment unit 290 is coupled to the third trigger 270 and the fourth trigger 271, and the alignment unit 290 transmits an alignment signal A2 to the third trigger 270 and the fourth trigger 271. When the third trigger 270 and the fourth trigger 271 receive the alignment signal A2, the third trigger 270 obtains the third image signal S30 from the third buffer 250 through the seventh image channel 470, and the fourth trigger 271 obtains the third timing control signal S31 from the fourth buffer 251 through the seventh timing control channel 471. Moreover, the third trigger 270 and the fourth trigger 271 synchronously transmit the third image signal S30 and the third timing control signal S31 to the display unit 230 according to the alignment signal A2. Based on this, the display device 200 synchronously receives the third image channel 430 and the third timing control channel 431, and the third image signal S30 and the third timing control channel 431 may correctly correspond to each other according to the synchronous receiving. In this way, errors as a result of a time difference can be avoided when the display device 200 displays the third image signal S30 and converts the polarity of the liquid crystal according to the third timing control channel 431.

Figure 6:
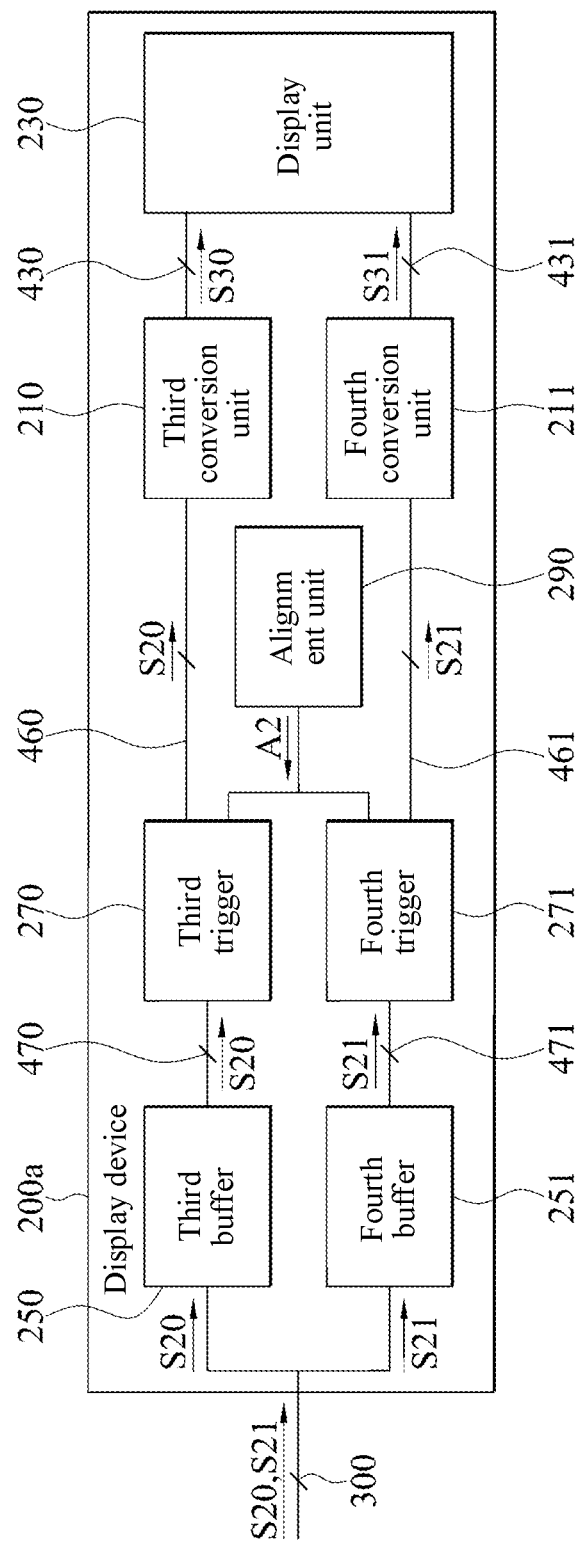
FIG. 6 is a schematic block diagram of another embodiment of a display device of the split-type display system according to the present disclosure.

In some other embodiments, referring to FIG. 6, in a processing device 200a, positions of the third buffer 250 and the third trigger 270 may be transposed with a position of the third conversion unit 210, and positions of the fourth buffer 251 and the fourth trigger 271 may be transposed with a position of the fourth conversion unit 211. In detail, the third buffer 250 and the fourth buffer 251 are coupled to the transmission cable 300. The third trigger 270 is coupled between the third buffer 250 and the third conversion unit 210, the third buffer 250 and the third trigger 270 have a seventh image channel 470 therebetween, and the third trigger 270 and the third conversion unit 210 have a sixth image channel 460 therebetween. The fourth trigger 271 is coupled between the fourth buffer 251 and the fourth conversion unit 211, the fourth buffer 251 and the fourth trigger 271 have a seventh timing control channel 471 therebetween, and the fourth trigger 271 and the fourth conversion unit 211 have a sixth timing control channel 461 therebetween. The third conversion unit 210 and the fourth conversion unit 211 are coupled to the display unit 230, and the conversion unit 210, 211 and the display unit 230 respectively have a third image channel 430 and a third timing control channel 431 therebetween. The seventh image channel 470 and the sixth image channel 460 have the same second image channel number as the second image signal S20, and the seventh timing control channel 471 and the sixth timing control channel 461 have the same second timing control channel number as the second timing control signal S21.

The transmission cable 300 transmits the second image signal S20 and the second timing control signal S21 and then respectively stores the signals in the third buffer 250 and the fourth buffer 251. The alignment unit 290 transmits the alignment signal A2 to the third trigger 270 and the fourth trigger 271. When the third trigger 270 and the fourth trigger 271 receive the alignment signal A2, the third trigger 270 obtains the second image signal S20 from the third buffer 250 through the seventh image channel 470, and the fourth trigger 271 obtains the second timing control signal S21 from the fourth buffer 251 through the seventh timing control channel 471. Moreover, the third trigger 270 and the fourth trigger 271 synchronously transmit the second image signal S20 and the second timing control signal S21 according to the alignment signal A2, respectively. The second image signal S20 and the second timing control signal S21 are synchronously transmitted to the third conversion unit 210 through the sixth image channel 460 and to the fourth conversion unit 211 through the sixth timing control channel 461. The third conversion unit 210 and the fourth conversion unit 211 may synchronously convert the second image signal S20 and the second timing control signal S21 into the third image signal S30 and the third timing control signal S31, and transmit the third image signal S30 and the third timing control signal S31 to the display unit 230 through the third image channel 430 and the third timing control channel 431. Based on this, errors as a result of a time difference can be avoided when the display unit 230 displays the third image signal S30 and converts the polarity of the liquid crystal according to the third timing control channel 431.

In some embodiments, referring to FIG. 7 and FIG. 2 to FIG. 6, a processing device 100b includes two first conversion units 130 and 132, two second conversion units 131 and 133, two first buffers 150 and 152, two second buffers 151 and 153, two first triggers 170 and 172, and two second triggers 171 and 173. A display device 200b includes two third conversion units 210 and 212, two fourth conversion units 211 and 213, two third buffers 250 and 252, two fourth buffers 251 and 253, two third triggers 270 and 272, and two fourth triggers 271 and 273. The above numbers do not constitute a limitation on the present disclosure. The first image channel 412 is coupled between the processing unit 110 and the first conversion unit 132. The fourth image channel 442 is coupled between the first conversion unit 132 and the first buffer 152. The fifth image channel 452 is coupled between the first buffer 152 and the first trigger 172. The first timing control channel 413 is coupled between the timing controller 111 in the processing unit 110 and the second conversion unit 133. The fourth timing control channel 443 is coupled between the second conversion unit 133 and the second buffer 153. The fifth timing control channel 453 is coupled between the second buffer 153 and the second trigger 173. The transmission cable 300 is coupled between the trigger 171, 173 and the conversion unit 211, 213. The sixth image channel 462 is coupled between the third conversion unit 212 and the third buffer 252. The seventh image channel 472 is coupled between the third buffer 252 and the third trigger 272. The third image channel 432 is coupled between the third trigger 272 and the display unit 230. The sixth timing control channel 463 is coupled between the fourth conversion unit 213 and the fourth buffer 253. The seventh timing control channel 473 is coupled between the fourth buffer 253 and the fourth trigger 273. The third timing control channel 433 is coupled between the fourth trigger 273 and the display unit 230. The fourth image channel 442 and the fifth image channel 452 have the same second image channel number as a second image signal S22, and the fourth timing control channel 443 and the fifth timing control channel 453 have the same second timing control channel number as a second timing control signal S23. The sixth image channel 462 and the seventh image channel 472 have the same third image channel number as a third image signal S32, and the sixth timing control channel 463 and the seventh timing control channel 473 have the same third timing control channel number as a third timing control signal S33. An operation between the conversion unit 132, 133, 212, 213, the buffer 152, 153, 252, 253, the trigger 172, 173, 272, 273, and the processing unit 110, the alignment unit 190, 290, the transmission cable 300, and the display unit 230 is similar to an operation of the conversion unit 130, 131, 210, 211, the buffer 150, 151, 250, 251, and the trigger 170, 171, 270, 271 in the above embodiments. Therefore, an embodiment in which the buffers 150-153 and 250-253 are coupled behind the conversion units 130-133 and 210-213 is given below by way of example for brief description.

Figure 7:
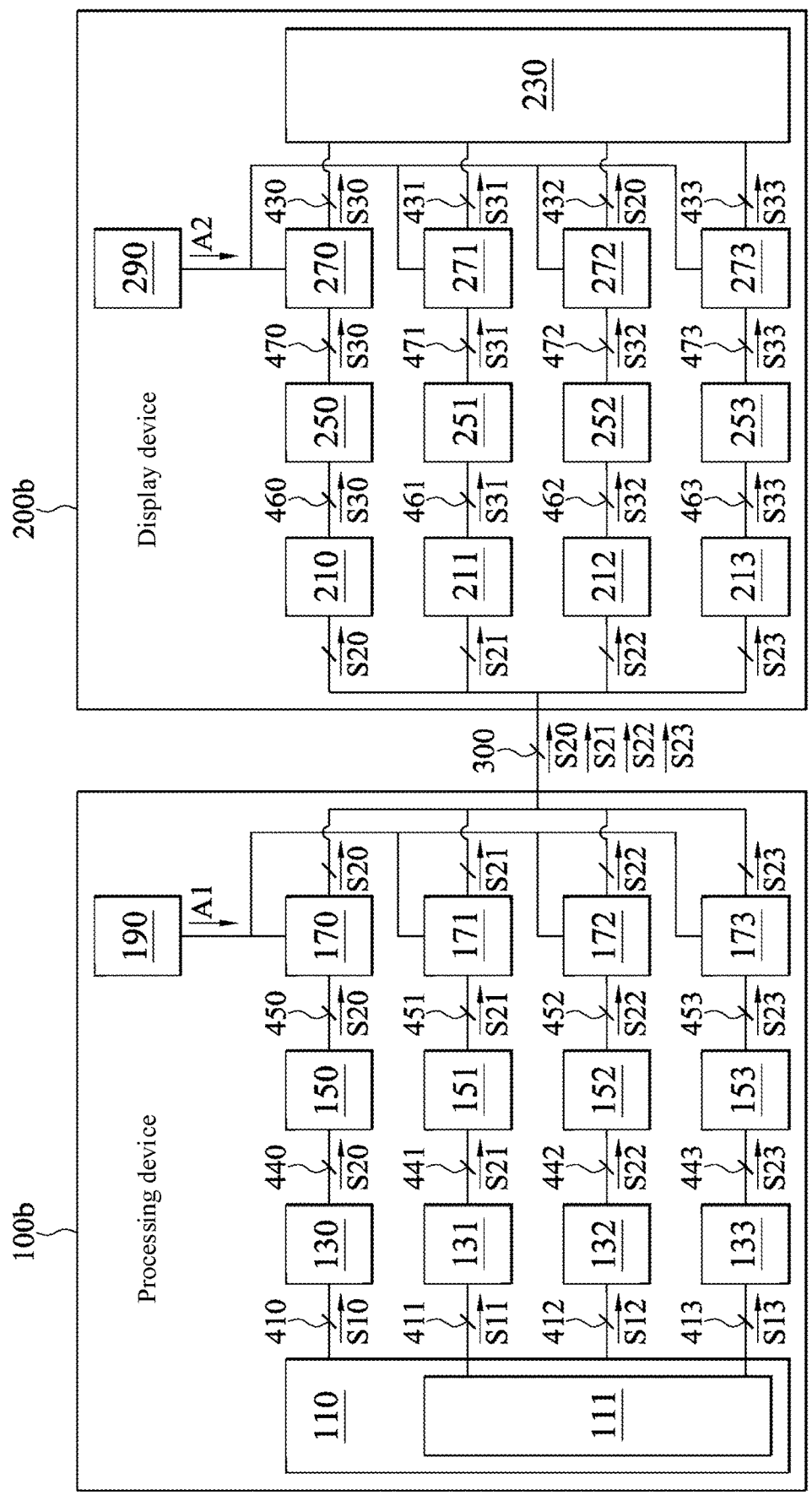
FIG. 7 is a schematic block diagram of another embodiment of the split-type display system according to the present disclosure.

As shown in FIG. 7, the processing unit 110 simultaneously generates the first image signal S10, S12 and the first timing control signal S11, S13. The processing unit 110 transmits the first image signal S12 to the first conversion unit 132, and transmits the first timing control signal S13 to the second conversion unit 133. The first image signal S12 and the first image channel 412 have the same first image channel number and first image rate. The first timing control signal S13 and the first timing control channel 413 have the same first timing control channel number and first timing control rate. The first conversion unit 132 and the second conversion unit 133 respectively convert the first image signal S12 and the first timing control signal S13 into the second image signal S22 and the second timing control signal S23, and respectively store the second image signal S22 and the second timing control signal S23 in the first buffer 152 and the second buffer 153. The second image signal S22 has substantially the same second image channel number and second image rate as the second image signal S20. The second timing control signal S23 has substantially the same second timing control channel number and second timing control rate as the second timing control signal S21. The alignment unit 190 transmits the alignment signal A1 to the first trigger 172 and the second trigger 173. When the first trigger 172 and the second trigger 173 receive the alignment signal A1, the first trigger 172 obtains the second image signal S22 from the first buffer 152, and the second trigger 173 obtains the second timing control signal S23 from the second buffer 153. Moreover, the first trigger 172 and the second trigger 173 synchronously transmit the second image signal S22 and the second timing control signal S23 according to the alignment signal A1, and the second image signal S22 and the second timing control signal S23 are respectively transmitted to the third conversion unit 212 and the fourth conversion unit 213 through the transmission cable 300.

The third conversion unit 212 and the fourth conversion unit 213 respectively convert the second image signal S22 and the second timing control signal S23 into the third image signal S32 and the third timing control signal S33, and respectively store the third image signal S32 and the third timing control signal S33 in the third buffer 252 and the fourth buffer 253. The third image signal S32 has substantially the same third image channel number and third image rate as the third image signal S30. The third timing control signal S33 has substantially the same third timing control channel number and third timing control rate as the third timing control signal S31. The alignment unit 290 transmits the alignment signal A2 to the third trigger 272 and the fourth trigger 273. When the third trigger 272 and the fourth trigger 273 receive the alignment signal A2, the third trigger 272 and the fourth trigger 273 respectively obtain the third image signal S32 and the third timing control signal S33 from the third buffer 250 and the fourth buffer 253. Moreover, the third trigger 272 and the fourth trigger 273 synchronously transmit the third image signal S32 and the third timing control signal S33 to the display unit 230 according to the alignment signal A2.

In some embodiments, the image transmission signals S10-S13, S20-S23, and S30-S33 each include image data and audio information. In some embodiments, the conversion units 130-133 and 210-213 may be software, hardware, firmware, or combined logic circuits. The triggers 170-173 and 270-273 may be logic circuits. The buffers 150-153 and 250-253 may be hardware registers. The processing unit 110 may be an embedded controller (EC), an application-specific integrated circuit (ASIC), or a system on a chip (SOC). The display unit may be a liquid crystal display (LCD) or a light-emitting diode (LED).

Based on the above, in some embodiments, by disposing the first conversion unit and the second conversion unit to increase the transmission rates of the image signal and the timing control signal, the channel number of the transmission cable can be reduced. Inconvenience to a user and costs of the transmission cable as a result of an excessively thick transmission cable are avoided. By disposing the third conversion unit and the fourth conversion unit to reduce the transmission rates of the image signal and the timing control signal, the display unit can smoothly display the image signal and convert the polarity of the liquid crystal. In addition, by disposing the buffers and the triggers, synchronization of transmission can be achieved, thereby avoiding errors of the display device during execution as a result of a time difference caused during transmission. By disposing a plurality of first conversion units, second conversion units, third conversion units, and fourth conversion units, transmission efficiency of the image signal and the timing control signal can also be improved, and more image signals and timing control signals can be transmitted, thereby providing image display with higher resolution and more efficient polarity conversion of the liquid crystal. In some embodiments, when a plurality of conversion units simultaneously operate, a image processing capability is improved, and the timing control signal can be transmitted by using only one set of the conversion units.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. A split-type display system, comprising:
    a processing device comprising:
        a processing unit configured to generate a first image signal and a first timing control signal, wherein the first timing control signal has a first timing control rate and a first timing control channel number, and the first timing control rate is less than a first image rate of the first image signal;
        a first conversion unit configured to convert the first image signal into a second image signal having a second image rate; and
        a second conversion unit configured to convert the first timing control signal into a second timing control signal, wherein the second timing control signal has a second timing control rate and a second timing control channel number, the first timing control rate is less than the second timing control rate, and the first timing control channel number is greater than the second timing control channel number;
    a display device comprising:
        a third conversion unit configured to receive and convert the second image signal into a third image signal;
        a fourth conversion unit configured to receive and convert the second timing control signal into a third timing control signal, wherein the third timing control signal has a third timing control rate and a third timing control channel number, and the third timing control rate is less than a third image rate of the third image signal; and
        a display unit configured to display the third image signal according to the third timing control signal; and
    a transmission cable configured to connect the first conversion unit and the second conversion unit to the third conversion unit and the fourth conversion unit, wherein a channel number of the transmission cable is equal to a sum of a image channel number of the second image signal and the second timing control channel number.

2. The split-type display system according to claim 1, wherein the first timing control channel number divided by the second timing control channel number is a ratio, and the second timing control rate divided by the first timing control rate is the ratio; and the third timing control channel number divided by the second timing control channel number is the ratio, and the second timing control rate divided by the third timing control rate is the ratio.

3. The split-type display system according to claim 2, wherein the processing device comprises a first buffer, a first trigger, a second buffer, and a second trigger, the first buffer receives and stores the second image signal from the first conversion unit, the second buffer receives and stores the second timing control signal from the second conversion unit, the first trigger transmits the second image signal to the transmission cable according to an alignment signal, and the second trigger transmits the second timing control signal to the transmission cable according to the alignment signal.

4. The split-type display system according to claim 2, wherein the processing device comprises a first buffer, a first trigger, a second buffer, and a second trigger, the first buffer receives and stores the first image signal from the processing unit, the second buffer receives and stores the first timing control signal from the processing unit, the first trigger transmits the first image signal to the first conversion unit according to an alignment signal, and the second trigger transmits the first timing control signal to the second conversion unit according to the alignment signal.

5. The split-type display system according to claim 4, wherein the display device comprises a third buffer, a third trigger, a fourth buffer, and a fourth trigger, the third buffer receives and stores the third image signal from the third conversion unit, the fourth buffer receives and stores the third timing control signal from the fourth conversion unit, the third trigger transmits the third image signal to the display unit according to another alignment signal, and the fourth trigger transmits the third timing control signal to the display unit according to the another alignment signal.

6. The split-type display system according to claim 4, wherein the display device comprises a third buffer, a third trigger, a fourth buffer, and a fourth trigger, the third buffer receives and stores the second image signal from the transmission cable, the fourth buffer receives and stores the second timing control signal from the transmission cable, the third trigger transmits the second image signal to the third conversion unit according to another alignment signal, and the fourth trigger transmits the second timing control signal to the fourth conversion unit according to the another alignment signal.

7. The split-type display system according to claim 1, wherein a length of the transmission cable is greater than 50 centimeters.

8. A split-type display system, comprising:
    a processing device comprising:
        a processing unit configured to generate a plurality of first image signals and a plurality of first timing control signals, wherein each of the first timing control signals has a first timing control rate and a first timing control channel number, and each of the first timing control rates is less than a first image rate of each of the first image signals; and
        a plurality of first conversion units corresponding to the first image signals in a one-to-one manner, wherein each of the first conversion units is configured to convert each of the first image signals into a second image signal having a second image rate; and
        a plurality of second conversion units corresponding to the first timing control signals in a one-to-one manner, wherein each of the second conversion units is configured to convert each of the first timing control signals into a second timing control signal, each of the second timing control signals has a second timing control rate and a second timing control channel number, each of the first timing control rates is less than each of the second timing control rates, and each of the first timing control channel numbers is greater than each of the second timing control channel numbers;
   a display device comprising:
      a plurality of third conversion units corresponding to the first conversion units in a one-to-one manner, wherein each of the third conversion units is configured to receive and convert each of the second image signals into a third image signal; and
      a plurality of fourth conversion units corresponding to the second conversion units in a one-to-one manner, wherein each of the fourth conversion units is configured to receive and convert each of the second timing control signals into a third timing control signal, each of the third timing control signals has a third timing control rate and a third timing control channel number, and each of the third timing control rates is less than a third image rate of each of the third image signals; and
      a display unit configured to display the third image signals according to the third timing control signals; and
   a transmission cable configured to connect the first conversion units and the second conversion units to the third conversion units and the fourth conversion units, wherein a channel number of the transmission cable is equal to a sum of image channel numbers of the second image signals and the second timing control channel numbers.

9. The split-type display system according to claim 8, wherein each of the first timing control channel numbers divided by each of the second timing control channel numbers is a ratio, and each of the second timing control rates divided by each of the first timing control rates is the ratio; and each of the third timing control channel numbers divided by each of the second timing control channel numbers is the ratio, and each of the second timing control rates divided by each of the third timing control rates is the ratio.

10. The split-type display system according to claim 9, wherein the processing device comprises a plurality of first buffers, a plurality of first triggers, a plurality of second buffers, and a plurality of second triggers, the first buffers and the first triggers correspond to the first conversion units in a one-to-one manner, the second buffers and the second triggers correspond to the second conversion units in a one-to-one manner, each of the first buffers receives and stores a corresponding one of the second image signals, each of the second image signals is from a corresponding one of the first conversion units, each of the second buffers receives and stores a corresponding one of the second timing control signals, each of the second timing control signals is from a corresponding one of the second conversion units, each of the first triggers transmits the corresponding one of the second image signals to the transmission cable according to an alignment signal, and each of the second triggers transmits the corresponding one of the second timing control signals to the transmission cable according to the alignment signal.

11. The split-type display system according to claim 9, wherein the processing device comprises a plurality of first buffers, a plurality of first triggers, a plurality of second buffers, and a plurality of second triggers, the first buffers and the first triggers correspond to the first conversion units in a one-to-one manner, the second buffers and the second triggers correspond to the second conversion units in a one-to-one manner, each of the first buffers receives and stores a corresponding one of the first image signals, each of the first image signals is from the processing unit, each of the second buffers receives and stores a corresponding one of the first timing control signals, each of the first timing control signals is from the processing unit, each of the first triggers transmits the corresponding one of the first image signals to a corresponding one of the first conversion units according to an alignment signal, and each of the second triggers transmits the corresponding one of the first timing control signals to a corresponding one of the second conversion units according to the alignment signal.

12. The split-type display system according to claim 11, wherein the display device comprises a plurality of third buffers, a plurality of third triggers, a plurality of fourth buffers, and a plurality of fourth triggers, the third buffers and the third triggers correspond to the third conversion units in a one-to-one manner, the fourth buffers and the fourth triggers correspond to the fourth conversion units in a one-to-one manner, each of the third buffers receives and stores a corresponding one of the third image signals, each of the third image signals is from a corresponding one of the third conversion units, each of the fourth buffers receives and stores a corresponding one of the third timing control signals, each of the second timing control signals is from a corresponding one of the fourth conversion units, each of the third triggers transmits the corresponding one of the third image signals to the display unit according to another alignment signal, and each of the fourth triggers transmits the corresponding one of the third timing control signals to the display unit according to the another alignment signal.

13. The split-type display system according to claim 11, wherein the display device comprises a plurality of third buffers, a plurality of third triggers, a plurality of fourth buffers, and a plurality of fourth triggers, the third buffers and the third triggers correspond to the third conversion units in a one-to-one manner, the fourth buffers and the fourth triggers correspond to the fourth conversion units in a one-to-one manner, each of the third buffers receives and stores a corresponding one of the second image signals, each of the second image signals is from the transmission cable, each of the fourth buffers receives and stores a corresponding one of the second timing control signals, each of the second timing control signals is from the transmission cable, each of the third triggers transmits the corresponding one of the second image signals to a corresponding one of the third conversion units according to another alignment signal, and each of the fourth triggers transmits the corresponding one of the second timing control signals to a corresponding one of the fourth conversion units according to the another alignment signals.

14. The split-type display system according to claim 8, wherein a length of the transmission cable is greater than 50 centimeters.

* * * * *